United States Patent [19]

Rietz et al.

[11] 3,909,712

[45] Sept. 30, 1975

[54] CIRCUIT ARRANGEMENT FOR MEASURING HIGH OHMIC CABLE FAULTS IN TELECOMMUNICATION AND SIMILAR NETWORKS

[75] Inventors: Wolfdietrich Rietz, Monkeberg; Otto Knutz, Klausdorf; Erhard Neubert, Kronshagen, all of Germany

[73] Assignee: Howaldtswerke-Deutsche Werft Aktiengesellschaft Hamburg und Kiel, Kiel, Germany

[22] Filed: Mar. 22, 1974

[21] Appl. No.: 453,752

[30] Foreign Application Priority Data
Apr. 6, 1973 Germany............................ 2317304

[52] U.S. Cl. ............................ 324/52; 179/175.3 F
[51] Int. Cl.² ......................................... G01R 31/11
[58] Field of Search ................ 324/52; 179/175.3 F

[56] References Cited
UNITED STATES PATENTS
2,651,752  9/1953  Devot ................................ 324/52

| | | | |
|---|---|---|---|
| 2,707,267 | 4/1955 | Gavin | 324/52 |
| 2,709,784 | 5/1955 | Spaulding | 324/52 |
| 3,488,580 | 1/1970 | Anderson et al. | 324/52 |
| 3,727,128 | 4/1973 | McFerrin | 324/52 |

*Primary Examiner*—Gerard R. Strecker
*Attorney, Agent, or Firm*—Markva & Smith

[57] ABSTRACT

A circuit arrangement for measuring high ohmic cable faults in telecommunication and similar networks comprises a D.C. voltage source and a pulse echo fault locator which are connected in parallel to a cable to be tested. The connection is effected in such a way that the pulse echo fault locator is isolated from said D.C. voltage source and that the pulses as well as the D.C. voltage are simultaneously applicable to the cable to bring about a change in the normal pulse echo pattern received from the fault in said cable. This change in the normal pulse echo pattern permits the fault in the cable to be recognized in the display and its position to be measured by said pulse echo fault locator by reference to its time base in a manner that is well understood.

8 Claims, 2 Drawing Figures

CIRCUIT ARRANGEMENT FOR MEASURING HIGH OHMIC CABLE FAULTS IN TELECOMMUNICATION AND SIMILAR NETWORKS

BACKGROUND OF THE INVENTION

This invention relates to an arrangement for indicating and locating high ohmic faults or wet faults in telecommunications cables by pulse echo location, which comprises a pulse echo fault locator connected to the tested cable through a D.C. isolating filter to permit a D.C. voltage to be applied to the cable simultaneously with the pulses.

The conventional pulse echo locating technique for locating a fault in a cable cannot be successful unless the reflection properties at the fault can be clearly differentiated from those of normal inhomogeneities in the cable. In conventional telecommunications cables the effect of these inhomogeneities may be sufficient to mask a high ohmic fault or even to compensate it completely.

Moreover, even the known differential methods, which involve comparing two conductor pairs, may not be sufficiently sensitive to reveal the presence of a high ohmic fault. Consequently it has been the practice to locate high ohmic faults by means of a bridge or first to convert a high ohmic fault to a low ohmic fault by the application of a D.C. potential. Not until this had first been done could such faults be located by a pulse echo fault locator. This technique which is sometimes referred to as "burning in" is not often used because of the consequential damage which may result.

SUMMARY OF THE INVENTION

It is the object of the present invention to improve the applicability range of the conventional method of pulse echo fault location by associating a low power D.C. voltage source with a normal pulse echo fault locator with a view to affecting and temporarily changing the reflection conditions at the fault so that this will reveal its presence in the form of a temporary change in the indicating trace on the screen of a display unit. It is thought that the change of a single reflection in the otherwise constant pattern of the display on the cathode ray screen will provide a sufficiently sensitive method of indication to eliminate the need of further specially treating the fault. The indication of the fault by the change in reflection can then be used for location with the usual degree of accuracy provided by a pulse echo fault locator.

According to the invention this object is achieved by the provision of a D.C. source connected to the faulty cable in parallel with the pulse generating unit, which is itself isolated from the D.C. source by the interposition of capacitors, so that the pulses and the D.C. voltage can be simultaneously applied to the tested cable and a change in the normal pulse echo trace due to a change in the reflection conditions at the fault of the tested cable to be produced, which change permits the fault to be identified in the pulse echo trace and its position determined in the usual manner by reference to the time base.

The principal distinguishing feature of the proposed arrangement and the use of D.C. is that it avails itself of the production of a polarization e.m.f. and electrolysis at the usually wet fault. It is a well known fact that the current/voltage curve of electrolytic events is completely different from that governed by Ohm's law, and it is this circumstance which permits the impedance at the fault to be changed for the duration of application of the D.C. voltage, and the reflection properties at the fault to be sufficiently altered to permit identification and location by the pulse echo. After the measurement the impedance at the fault will usually return to its previous value. In other words the otherwise usual potential breakthrough which produces fusion effects will not occur, and this enables the present method to make an otherwise impermissible use of the test voltage possible for affecting the fault.

In order to ensure that the fault in the cable can be clearly recognized it is preferred that the D.C. voltage source is adapted to be cyclically switched on and off or that the D.C. voltage source is of reversible polarity. Finally, in order to improve recognition of the fault, the D.C. voltage source may supply a controllably variable voltage.

BRIEF DESCRIPTION OF THE DRAWING

Two embodiments of the invention will now be described by way of example and with reference to the accompanying drawing, in which.

DESCRIPTION OF THE PREFERRED EMBODIMENTS

Figure 1:
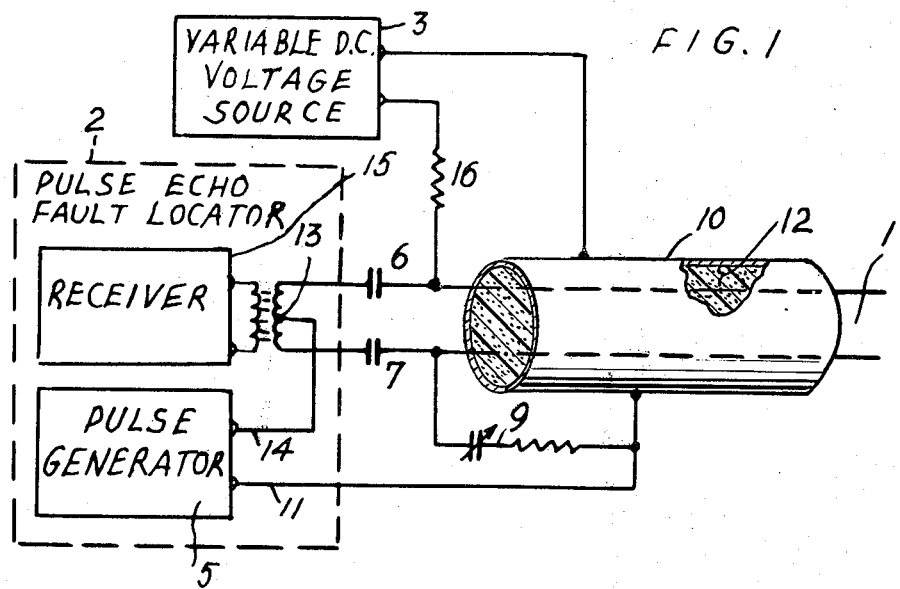
FIG. 1 is a block diagram of a circuit using the differential method, for changing the properties of a fault by the application of a D.C. voltage.

With reference to the embodiment shown in FIG. 1 a pulse echo fault locator 2 consisting of a pulse generator 5 and a receiver 15 is connected via a differential transformer and two isolating capacitors 6 and 7 to a conductor pair 1 in which there is a fault at 12. The pulse generator 5 of the pulse echo fault locator 2 is connected by a lead 11 constituting a first terminal to the shield of a cable 10, or to the other interconnected cable conductors (not illustrated), whereas a second terminal 14 is connected to the center tap 13 of the differential transformer. The pulse generator 5 transmits suitable pulses in the same phase in a periodic sequence to the pair of conductors 1. Inhomogenities of the pair of conductors as compared with the shield of the cable or as between the mutually connected conductors cause reflections of the pulses passing through the conductors. These reflected signals are transmitted to the differential transformer and the receiver 15 where they are shown on the screen of a cathode ray tube. The distance of the fault location can be determined knowing the speed of transmission and the time elapsed between emission of the pulse and the received signal. The series connection of a resistor and capacitor 9 serves to compensate imbalance caused by the locator 2 being connected up as described. A variable D.C. voltage source 3 which supplies a weak current is connected via a resistor 16 to the conductor containing the fault in the cable 10. When the voltage source is switched on it should cause galvanic polarization and the stationary pulse echo trace will be affected by a single reflection being changed. This change, even if it is slight, usually appears intermittently and is therefore easily detectable in the otherwise stationary pattern of the display.

Figure 2:
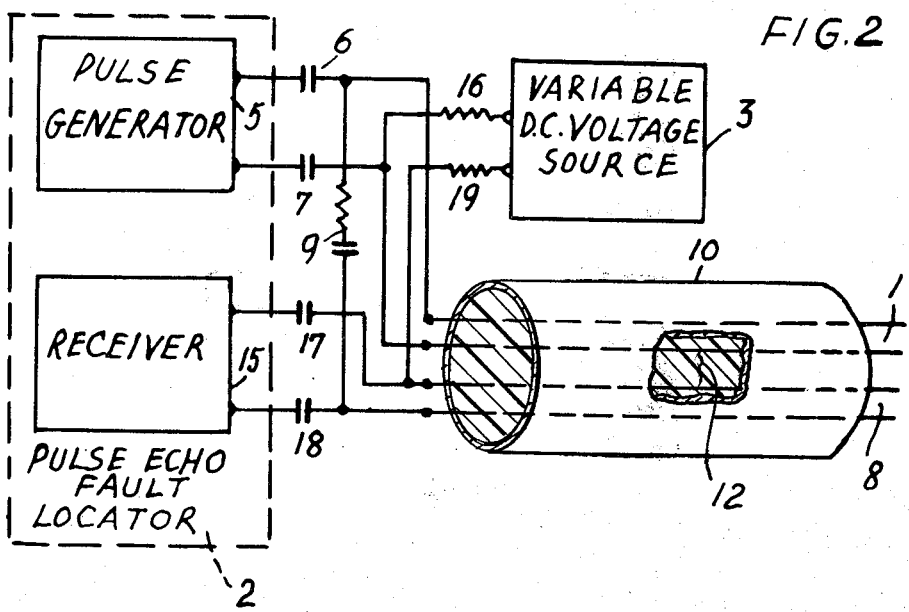
FIG. 2 is a block diagram of an arrangement for locating a coupling fault.

In the embodiment shown in FIG. 2 the same circuit arrangement is used for a coupling fault measurement.

A pulse generator 5 of a pulse echo fault locator 2 is connected via two capacitors 6 and 7 to one conductor pair 1 in a cable 10, whereas the amplifier (not shown) of a pulse generator 5 is likewise connected through two capacitors 17 and 18 to a corresponding second conductor pair 8. In this arrangement a variable D.C. voltage source 3 is connected through resistors 16 and 19 to one conductor of each pair. The effect described with reference to FIG. 1 arises in the same way in this circuit arrangement.

The invention may be embodied in other specific forms without departing from the spirit or essential characteristics thereof. The embodiments are therefore to be considered in all respects as illustrative and not restrictive.

What is claimed is:

1. A circuit arrangement for measuring high ohmic faults in telecommunication and similar network cables comprising:
   a. a D.C. voltage source;
   b. a first pair of conductor means for connecting said D.C. voltage source to first and second conductors in said cable;
   c. a pulse echo fault locator, said pulse echo fault locator comprising a pulse generator and a receiver including a differential transformer;
   d. a second pair of conductor means for connecting said pulse generator to said first conductor in said cable and said differential transformer respectively;
   e. a third pair of conductor means, each including a capacitor, for connecting said differential transformer to said second conductor and a third conductor in said cable; and
   f. circuit means including a resistor and a capacitor for connecting said first and third conductors in said cable;
   g. whereby both a D.C. voltage and a pulse may be applied to said conductors in said cable, and the pulse reflected by a fault in said cable can be detected and measured by said receiver to determine the location of said fault in said cable.

2. A circuit arrangement according to claim 1, wherein said D.C. voltage source is adapted to be cyclically switched on and off.

3. A circuit arrangement according to claim 1, wherein said D.C. voltage source is of reversible polarity.

4. A circuit arrangement according to claim 1, wherein said D.C. voltage source supplies a controllably variable voltage.

5. A circuit arrangement for measuring high ohmic faults in telecommunication and similar network cables comprising:
   a. a D.C. voltage source;
   b. a first pair of conductor means for connecting said D.C. voltage source to first and second conductors in said cable;
   c. a pulse echo fault locator, said pulse echo fault locator comprising a pulse generator and a receiver;
   d. a second pair of conductor means, each including a capacitor, for connecting said pulse generator to said first conductor and a third conductor in said cable respectively;
   e. a third pair of conductor means, each including a capacitor, for connecting said receiver to said second conductor and a fourth conductor in said cable; and
   f. circuit means including a resistor and a capacitor for connecting said third and fourth conductors in said cable;
   g. whereby both a D.C. voltage and a pulse may be applied to said conductors in said cable, and the pulse reflected by a fault in said cable can be detected and measured by said receiver to determine the location of said fault in said cable.

6. A circuit arrangement according to claim 5, wherein said D.C. voltage source is adapted to be cyclically switched on and off.

7. A circuit arrangement according to claim 5, wherein said D.C. voltage source is of reversible polarity.

8. A circuit arrangement according to claim 5, wherein said D.C. voltage source supplies a controllably variable voltage.

* * * * *